United States Patent

[15] 3,675,202

Verhoeff

[45] July 4, 1972

[54] DEVICE FOR CHECKING A GROUP OF SYMBOLS TO WHICH A CHECKING SYMBOL IS JOINED AND FOR DETERMINING THIS CHECKING SYMBOL

[72] Inventor: Jacobus Verhoeff, Hague, Netherlands
[73] Assignee: U.S. Philips Corporation, New York, N.Y.
[22] Filed: June 1, 1970
[21] Appl. No.: 41,892

[30] Foreign Application Priority Data

May 30, 1969 Netherlands..........................6908248

[52] U.S. Cl..............................340/146.1 AQ, 235/61.7 A
[51] Int. Cl.........................................................G06f 11/10
[58] Field of Search....................340/146.1; 235/153, 61.7 A

[56] References Cited

UNITED STATES PATENTS

| | | | |
|---|---|---|---|
| 3,517,385 | 6/1970 | Katsuragi | 340/146.1 |
| 3,484,744 | 12/1969 | Gertler et al. | 340/146.1 |
| 3,384,902 | 5/1968 | Schroder et al. | 340/146.1 |
| 3,448,254 | 6/1969 | Verhoeff | 235/153 |
| 3,526,875 | 9/1970 | Jourdan | 340/146.1 |

*Primary Examiner*—Charles E. Atkinson
*Attorney*—Frank R. Trifari

[57] ABSTRACT

A device for checking a group of symbols including a check symbol, the symbols being chosen from $2m$ different symbols, the device operating by assigning a fixed value to each incoming symbol weighted in accordance with order of reception, forming the product of the incoming product and storing same, the check indicating correctness or incorrectness after reception of an entire group of symbols by comparing the final result with a predetermined value.

16 Claims, 5 Drawing Figures

INVENTOR.
JACOBUS VERHOEFF

BY
AGENT

DEVICE FOR CHECKING A GROUP OF SYMBOLS TO WHICH A CHECKING SYMBOL IS JOINED AND FOR DETERMINING THIS CHECKING SYMBOL

The invention relates to a device for checking a group of symbols to which a checking symbol is joined and also relates to a device for determining this checking symbol.

In known digit checking methods separate errors are detected, but detection of various other kinds of errors is often a failure. So far only one decimal checking system is known capable of detecting completely non-correlated errors, transpositions (ab → ba) and phonetic errors (13 → 30); (1n → n0). However, this known method has the disadvantage that skipping permutations (abc → cba) although, seldom, it is true, and which form only about one tenth of the number of errors formed by adjacent transpositions, are only about 67 percent detected.

Likewise double errors (aa → bb), which occur approximately to the same small extent as said skipping transpositions, are not will detected, i.e. for about 55 percent.

The object of the invention is to detect skipping errors and double errors in an improved manner and to detect for the full 100 percent non-correlated errors, permutation errors and phonetic errors in the same manner as before.

Said improvements can be achieved by the device in accordance with the invention by choosing the symbols from $2m$ different ones. The device would include means by which to each incoming symbol a fixed value is joined preferably depending upon the order of reception of the diedric group of the order of $2m$ so that per position different values are joined to different symbols. Means are provided to form the steady product (in accordance with the multiplication of the diedric group) of these incoming values and to register it in a store, the check indicating correct or incorrect if subsequent to the introduction of the whole group of symbols the final result has or has not respectively a fixed selected value. The device according to the invention provides the advantage of an important improvement of the assessment of double errors ($aa \rightarrow bb$) as compared with the known devices and the advantage of an at least 94 percent -ic assessment of skipping transpositions ($abc \rightarrow cba$) and skipping double errors ($aba \rightarrow cbc$). The device according to the invention allows this because the cyclic adder is replaced by an adder working in accordance with the operation of a diedric group, which will be termed hereinafter "multiplication."

In mathematics it is common practice to define a group as a set V, in which a binary (i.e. operating on two elements) operation, usually termed X or + is indicated, by which to every two elements $a$ and $b$ of V a third element $c$ of V is unambiguously joined. This relation is indicated by $c = aXb$, and $a + b = c$ respectively. It is furthermore necessary for the pair (V, X) to satisfy the following requirements:

1. For all $a$, $b$ and $c$ of V it is true or should apply that: $aX(bXc) = (aXb)Xc$. This is the so-called associative law, which allows enabling expressions such as $aXbXc$.

2. in V an element $e$ has to be present, which satisfies the condition $eXa = aXe = a$ for all $a$'s of V. This element is termed the unit element of the group.

3. With every element $a$ of V there has to be present an element $a^{-1}$ in V, having the property that $aXa^{-1} = a^{-1}Xa = e$. The element $a^{-1}$ is termed the inverse of $a$.

Groups satisfying, in addition, the condition:

4. that for every two elements $a$ and $b$ of V it is true or should apply that $aXb = bXa$, which are termed commutative or Abels. In Abelian groups the operation is frequently indicated by +, whereas the unit element is then termed zero element.

Although the group concept is not generally known as such, groups are frequently employed. For example, the integer numbers form an Abelian group under addition. Therein $e = 0$ and $a^{-1} = -a$. Moreover, the permutations of, for example, $n$ symbols form a group. The operation then consists in the consecutive performance of the permutations. For example, $n = 3$ and the symbols to be permuted $\alpha$, $\beta$ and $\gamma$. The permutation exchanging, for example, $\beta$ and $\alpha$ is indicated by $\begin{pmatrix}\alpha\beta\gamma\\\beta\alpha\gamma\end{pmatrix}$ or $(\alpha\beta)$. If this permutating $f$ and if $g$, $\begin{pmatrix}\alpha\beta\gamma\\\beta\gamma\alpha\end{pmatrix}$ then $fXg$ is the permutation $\begin{pmatrix}\alpha\beta\gamma\\\alpha\gamma\beta\end{pmatrix}$ and $gXf = \begin{pmatrix}\alpha\beta\gamma\\\gamma\beta\alpha\end{pmatrix}$ so that so that this group is not commutative. It is common practice to omit the operation sign in such transformation groups.

Also, geometrics groups are often employed. For example, the shifts in the flat plane form a transformation group. For the digital technique, of course, the groups comprising a finite multiple of elements are important. Generally known is the case in which V consists of 0 and 1, wherein $0 + 0 = 1 + 1 = 0$ and $0 + 1 = 1 + 0 = 1$. This group is the so-called cyclic group of two elements. It is a particular case of a cyclic group comprising $m$ elements, which may be considered to be a modulo $m$ addition. The mathematical interpretation as a transformation group is advantageous which group consists of the rotations causing a regular $m$-gon to overlap themselves. The group may be built up with a basic transformation, for example, a rotation through $360/m°$ around the center. If this rotation is termed $\delta$, the elements of the group are $\delta^j$ with $m>j>0$, wherein $\delta^0$ is interpreted as o-times rotation. If $k$ is a number not having common dividers with $m$ and if $\epsilon$ is the rotation corresponding to $\delta^k$, these group elements may be represented by $\epsilon^j$ for $m>j>0$, be it in a different order of succession. The representation $\delta^j \rightarrow \epsilon^j$ provides a permutation of the group elements which leaves the operation invariant. Such a permutation is termed an automorphy. For an automorphy $t$ it thus applies that $(t(aXb) = t(a)Xt(b)$ for all $a$ and $b$ of V. It is interesting that the automorphies of a group itself form a (permutation) group. For example, $s(t(aXb)) = s(t(a)Xt(b)) = s(t())Xs(t(b)) = st(a)Xst(b)$.

Less known are the so-called diedric groups which may be defined as the transformations consisting of the rotations and reflections causing a regular $m$-gon to overlap itself. These groups may be described by means of two basic elements, for example, a rotation over $360/m°$ and a reflection $\epsilon$ relative to one of the axes of symmetry of the $m$-gon. The $2m$ elements of the group are then $\delta^j$ and $\delta^j\epsilon$ with $m >j >0$, wherein the relations $\delta^m = \delta^0$; $\epsilon^2 = \epsilon^0$ and $\epsilon X \delta = \epsilon^{-1} \times \epsilon$, which will be obvious from the interpretation.

Technical uses of the diedric groups have so far not been common. This may be due to the fact that, as will be seen from the last-mentioned relation, they are not commutative. However, this property may provide a solution for the technique of digit check, where the very permutations $ab \rightarrow ba$ can be detected only with great difficulty, as will be seen from the present invention.

For decimal numbers of course in particular the diedric group of the pentagon is important. The digits may be joined as follows to the elements $\delta^j$; $\delta^j\epsilon$: $0 \rightarrow \delta^0$; $1 \rightarrow \delta^1$; $2 \rightarrow \delta^2$; $3 \rightarrow \delta^3$; $4 \rightarrow \delta^4$; $5 \rightarrow \delta^0\epsilon$; $6 \rightarrow \delta^1\epsilon$; $7 \rightarrow \delta^2\epsilon$; $8 \rightarrow \delta^3\epsilon$; $9 \rightarrow \delta^4\epsilon$. The elements of this group may be presented in any conventional (or non-conventional) manner in a circuit arrangement comprising 10 position members or the like. In this connection the term "values" will be used in this specification instead of "elements," because this word is somewhat over-used in technology. The multiplication is performed, as will be seen, according to the following table.

TABLE A

| X | 0 | 1 | 2 | 3 | 4 | 5 | 6 | 7 | 8 | 9 |
|---|---|---|---|---|---|---|---|---|---|---|
| 0 | 0 | 1 | 2 | 3 | 4 | 5 | 6 | 7 | 8 | 9 |
| 1 | 1 | 2 | 3 | 4 | 0 | 6 | 7 | 8 | 9 | 5 |
| 2 | 2 | 3 | 4 | 0 | 1 | 7 | 8 | 9 | 5 | 6 |
| 3 | 3 | 4 | 0 | 1 | 2 | 8 | 9 | 5 | 6 | 7 |
| 4 | 4 | 0 | 1 | 2 | 3 | 9 | 5 | 6 | 7 | 8 |
| 5 | 5 | 9 | 8 | 7 | 6 | 0 | 4 | 3 | 2 | 1 |
| 6 | 6 | 5 | 9 | 8 | 7 | 1 | 0 | 4 | 3 | 2 |
| 7 | 7 | 6 | 5 | 9 | 8 | 2 | 1 | 0 | 4 | 3 |
| 8 | 8 | 7 | 6 | 5 | 9 | 3 | 2 | 1 | 0 | 4 |
| 9 | 9 | 8 | 7 | 6 | 5 | 4 | 3 | 2 | 1 | 0 |

The formation of Table A is based on:

| X | $\delta^j$ | $\delta^{j\epsilon}$ |
| --- | --- | --- |
| $\delta^i$ | $\delta^{i+j}$ | $\delta^{i+j\epsilon}$ |
| $\delta^{i\epsilon}$ | $\delta^{i-j\epsilon}$ | $\delta^{i-j}$ |

The group of automorphies of this decimal diedric group comprises 20 permutations, as can be proved mathematically. It may suffice herein to give a list of these permutations:

TABLE B

| X | 0 | 1 | 2 | 3 | 4 | 5 | 6 | 7 | 8 | 9 |
| --- | --- | --- | --- | --- | --- | --- | --- | --- | --- | --- |
| $S_1(x)$ | 0 | 1 | 2 | 3 | 4 | 5 | 6 | 7 | 8 | 9 |
| $S_2(x)$ | 0 | 1 | 2 | 3 | 4 | 6 | 7 | 8 | 9 | 5 |
| $S_3(x)$ | 0 | 1 | 2 | 3 | 4 | 7 | 8 | 9 | 5 | 6 |
| $S_4(x)$ | 0 | 1 | 2 | 3 | 4 | 8 | 9 | 5 | 6 | 7 |
| $S_5(x)$ | 0 | 1 | 2 | 3 | 4 | 9 | 5 | 6 | 7 | 8 |
| $S_6(x)$ | 0 | 4 | 3 | 2 | 1 | 5 | 9 | 8 | 7 | 6 |
| $S_7(x)$ | 0 | 4 | 3 | 2 | 1 | 6 | 5 | 9 | 8 | 7 |
| $S_8(x)$ | 0 | 4 | 3 | 2 | 1 | 7 | 6 | 5 | 9 | 8 |
| $S_9(x)$ | 0 | 4 | 3 | 2 | 1 | 8 | 7 | 6 | 5 | 9 |
| $S_{10}(x)$ | 0 | 4 | 3 | 2 | 1 | 9 | 8 | 7 | 6 | 5 |
| $S_{11}(x)$ | 0 | 2 | 4 | 1 | 3 | 5 | 7 | 9 | 6 | 8 |
| $S_{12}(x)$ | 0 | 2 | 4 | 1 | 3 | 6 | 8 | 5 | 7 | 9 |
| $S_{13}(x)$ | 0 | 2 | 4 | 1 | 3 | 7 | 9 | 6 | 8 | 5 |
| $S_{14}(x)$ | 0 | 2 | 4 | 1 | 3 | 8 | 5 | 7 | 9 | 6 |
| $S_{15}(x)$ | 0 | 2 | 4 | 1 | 3 | 9 | 6 | 8 | 5 | 7 |
| $S_{16}(x)$ | 0 | 3 | 1 | 4 | 2 | 5 | 8 | 6 | 9 | 7 |
| $S_{17}(x)$ | 0 | 3 | 1 | 4 | 2 | 6 | 9 | 7 | 5 | 8 |
| $S_{18}(x)$ | 0 | 3 | 1 | 4 | 2 | 7 | 5 | 8 | 6 | 9 |
| $S_{19}(x)$ | 0 | 3 | 1 | 4 | 2 | 8 | 6 | 9 | 7 | 5 |
| $S_{20}(x)$ | 0 | 3 | 1 | 4 | 2 | 9 | 7 | 5 | 8 | 6 |

An advantageous embodiment of the device in accordance with the invention, in which the transposition errors are detected for 100 percent, is characterized in that the permutations of the values produced by representing the value joined to a given symbol at a given position in the group of symbols by the value which would be joined to the same symbol if it were at the next position, have the property that, for every two different values, the product in the diedric group of the first value and the value joined by each of the said permutations to the second value differs from the product of the second value and the representation at the same permutation of the first value.

The assessment of these transposition errors is determined by the formula:

$$f_i(a) \; Xf_{i+1}(b) \to f_i(b) Xf_{i+1}(a),$$

wherein $f_i$ is the adjunction for the symbol at the $i^{th}$ position to the value of the diedric group, or the equivalent formula:

$$xXg_i(y) \to yXg_i(x)$$

wherein $g_i$ is the permutation produced by performing first the inverse of $f_i$ and then the multiplication with $f_{i+1}$, thus:

$$g_i = f_{i+1} f_i^{-1},$$

wherein $g_i$ is the aforesaid permutation of the values, and wherein $x = f_i(a)$ and $y = f_i(b)$.

Therein with a decimal code for $m = 2$, in total 34,040 permutations can satisfy this requirement.

According to the invention the permutations may each have the property that the values produced by multiplication of each value of the diedric group in this group by the value joined by the permutation to the first-mentioned value are different to the maximum.

This serves to allow the device to detect as much as possible double errors ($aa \to bb$). For this purpose for a maximum number of pairs the following inequality has to be satisfied:

$$xXg_i(x) \qquad yXg_i(y).$$

In a decimal code for $m = 2$ in total 6,000 permutations are possible, which may be described as being:

$$g_i(x) = s \; h_j s^{-1}(aXx) Xb$$

wherein $a$ and $b$ are arbitrary values of $D_5$ and wherein $s$ is an arbitrary automorphy of $D_5$ and $h_j$ is one of the following three permutations:

$$h_1 = \begin{pmatrix} 0 & 1 & 2 & 3 & 4 & 5 & 6 & 7 & 8 & 9 \\ 0 & 6 & 4 & 2 & 7 & 8 & 1 & 3 & 9 & 5 \end{pmatrix}$$

$$h_2 = \begin{pmatrix} 0 & 1 & 2 & 3 & 4 & 5 & 6 & 7 & 8 & 9 \\ 0 & 5 & 8 & 2 & 6 & 3 & 7 & 9 & 4 & 1 \end{pmatrix}$$

$$h_3 = \begin{pmatrix} 0 & 1 & 2 & 3 & 4 & 5 & 6 & 7 & 8 & 9 \\ 0 & 7 & 9 & 6 & 1 & 8 & 4 & 2 & 3 & 5 \end{pmatrix}$$

In order to detect a maximum number of skipping transpositions ($abc \to cba$) and skipping double errors ($aba \to cbc$) the consecutive $g_i$ and $g_{i+1}$ have to be combined so that for a maximum number of pairs ac the following inequalities apply:

$$xXy^{-1}Xg_{i+1}g_i(z) \ne z\,Xy^{-1}Xg_{i+1}g_i(x)$$

and $$xXy^{-1}X\,g_{i+1}g_i(x) \ne z\,Xy^{-1}Xg_{i+1}g_i(z)$$

wherein $$x = f_i(a); \quad y^{-1} = f_{i+1}(b)$$

and $$z = f_i(c).$$

It has been found that among 36,000,000 (6000²) possible combinations $g_i$ and $g_{i+1}$ 200,000 combinations enable a 94 percent assessment of these two types of errors. An advantageous embodiment is therefore obtained by choosing all $g_i$ so that every consecutive pair is among the said 200,000 pairs.

According to the invention the means forming the steady product of the incoming values may be formed by a $2m$-valent register in which after each incoming symbol the value provided by a code converter is written. The code converter converts the prior value of the register and the value joined to the relevant incoming symbol as incoming signals into the value corresponding to the product in the diedric group of the two aforesaid values in the corresponding order of succession, the final position of the register determining the steady product.

The device embodying the invention may also be provided with a cyclic $m$-counter and a 2-divider, said $m$-counter forwardly and backwardly under the control of the 2-divider. The $2m$ values of the diedric group joined to symbols are represented by pulse sequences having different numbers of pulses are lying between 1 and $2m$. The pulses are applied to the cyclic $m$-counter, after the reception of each sequence being reset only when the relevant pulse sequence exceeds $m$. The final positions of the cyclic $m$-counter and of the 2-divider then determine the steady product. In this embodiment, if the number of pulses of a sequence exceeds $m$, this cyclic $m$-counter will not be affected by the first $m$ pulses. This may be avoided by a different coding, in which the pulse sequences are from 1 to $2m$ and after the termination of the pulse sequence a different conductor receives a pulse when the number of pulses in this sequence in the preceding coding exceeds $m$. This pulse can be directly applied to the 2-divider.

When the symbols are introduced one by one it is necessary in accordance with the invention to distinguish the positions of the symbols inside the group of symbols, for which purpose in accordance with the invention a counter may be provided. The counter is set at zero at the beginning of each group of symbols introduced and steps on by one at every incoming pulse signal. The pulse and the incoming symbols are applied to the inputs of a code converter the outputs of which represent the values from the diedric group joined to said symbol.

In many cases a periodical code is preferred so that $f_i = f_{i+k}$ for all $i$ applies with a fixed $k$ forming a positive integer, wherein $k$ should be chosen not to be too small, $k$ being preferably at least 3. In this case a cyclic $k$-counter will suffice.

In accordance with the invention the device may be simplified by choosing the adjunctions so that the permutations, independently of the positions of every pair, are all equal to ($f_i = g_i$). There may be $2m$ binary shift register sections, the sections being subdivided in groups in dependence upon the permutation, said groups being consecutively coupled separately in a given order of succession also depending upon the permutation. The sections are adjoined in a fixed manner to the symbols, the corresponding section receiving, by the introduction of a symbol a "1" and the other sections a "0." An equal number of pulses are joined to the sections as corresponds to the ordinal number of introduction of the symbol, whilst in a fixed manner to a diedric group, in which the position of the "1" determines the adjoined value of the diedric group.

In practice are particularly interesting the cases in which $m = 5$ and the groups of symbols may be decimal numbers, the diedric group thus having 10 values which are represented by 0, 1, 2, 3, 4, 5, 6, 7, 8, 9 so that the multiplication in this group is performed in accordance with the Table A.

TABLE A

| X | 0 | 1 | 2 | 3 | 4 | 5 | 6 | 7 | 8 | 9 |
|---|---|---|---|---|---|---|---|---|---|---|
| 0 | 0 | 1 | 2 | 3 | 4 | 5 | 6 | 7 | 8 | 9 |
| 1 | 1 | 2 | 3 | 4 | 0 | 6 | 7 | 8 | 9 | 5 |
| 2 | 2 | 3 | 4 | 0 | 1 | 7 | 8 | 9 | 5 | 6 |
| 3 | 3 | 4 | 0 | 1 | 2 | 8 | 9 | 5 | 6 | 7 |
| 4 | 4 | 0 | 1 | 2 | 3 | 9 | 5 | 6 | 7 | 8 |
| 5 | 5 | 9 | 8 | 7 | 6 | 0 | 4 | 3 | 2 | 1 |
| 6 | 6 | 5 | 9 | 8 | 7 | 1 | 0 | 4 | 3 | 2 |
| 7 | 7 | 6 | 5 | 9 | 8 | 2 | 1 | 0 | 4 | 3 |
| 8 | 8 | 7 | 6 | 5 | 9 | 3 | 2 | 1 | 0 | 4 |
| 9 | 9 | 8 | 7 | 6 | 5 | 4 | 3 | 2 | 1 | 0 |

If the groups of symbols are decimal numbers a special requirement applies to the detection of phonetic errors (for example, 30 −13). A device according to the invention satisfies this requirement and it is characterized in that for every decimal digit at every position the value adjoined from the diedric group, multiplied in the diedric group by the value adjoined to 0 at the next position is preferably a maximum number of times unequal to the value adjoined to 1 at the first-mentioned position multiplied by the value adjoined to the first-mentioned decimal digit at the next position.

An advantageous embodiment of this device is obtained by choosing $k$ to be equal to 12 and by performing the adjunction of the 10 symbols of the groups of symbols to be introduced in accordance with the following Table C.

TABLE C

Ordinal number of symbol in the order of introduction.

| | 1 | 2 | 3 | 4 | 5 | 6 | 7 | 8 | 9 | 10 |
|---|---|---|---|---|---|---|---|---|---|---|
| | 11 | 12 | | | | | | | | |
| 0 | 0 | 3 | 4 | 4 | 1 | 3 | 3 | 2 | 1 | 1 | 4 |
| | 2 | 2 | | | | | | | | |
| 1 | 1 | 1 | 9 | 8 | 2 | 5 | 8 | 4 | 7 | 8 | 3 |
| | 6 | 8 | | | | | | | | |
| 2 | 2 | 2 | 1 | 5 | 6 | 0 | 9 | 8 | 9 | 2 | 2 |
| | 9 | 6 | | | | | | | | |
| 3 | 3 | 0 | 2 | 0 | 9 | 1 | 4 | 6 | 5 | 9 | 6 |
| | 8 | 3 | | | | | | | | |
| 4 | 4 | 4 | 5 | 9 | 4 | 2 | 7 | 9 | 0 | 5 | 8 |
| | 5 | 4 | | | | | | | | |
| 5 | 5 | 5 | 6 | 7 | 5 | 8 | 2 | 0 | 3 | 0 | 7 |
| | 4 | 1 | | | | | | | | |
| 6 | 6 | 6 | 3 | 2 | 7 | 9 | 6 | 7 | 8 | 4 | 0 |
| | 1 | 0 | | | | | | | | |
| 7 | 7 | 7 | 0 | 6 | 8 | 6 | 1 | 1 | 6 | 7 | 1 |
| | 3 | 9 | | | | | | | | |
| 8 | 8 | 8 | 7 | 3 | 3 | 7 | 5 | 3 | 4 | 6 | 5 |
| | 0 | 7 | | | | | | | | |
| 9 | 9 | 9 | 8 | 1 | 0 | 4 | 0 | 5 | 2 | 3 | 9 |
| | 7 | 5 | | | | | | | | |

All types of errors are then detected to the optimum.

A simpler device according to the invention, in which the phonetic errors occurring less frequently than the other types of errors are, however, not detected for about 2 percent, is characterized in that the permutations are all equal to

| $g(x)$ | 9 | 2 | 8 | 0 | 7 | 3 | 5 | 4 | 6 | 1 |
|---|---|---|---|---|---|---|---|---|---|---|

| X | 0 | 1 | 2 | 3 | 4 | 5 | 6 | 7 | 8 | 9 |
|---|---|---|---|---|---|---|---|---|---|---| so that after a preferential choice of the adjunction these adjunctions are determined by the following Table D.

TABLE D.

| | 0 | 1 | 2 | 3 | 4 | 5 | 6 | 7 | 8 | 9 |
|---|---|---|---|---|---|---|---|---|---|---|
| $f_1(x)$ | 9 | 1 | 6 | 4 | 5 | 3 | 7 | 0 | 8 | 2 |
| $f_2(x)$ | 1 | 2 | 5 | 7 | 3 | 0 | 4 | 9 | 6 | 8 |
| $f_3(x)$ | 2 | 8 | 3 | 4 | 0 | 9 | 7 | 1 | 5 | 6 |
| $f_4(x)$ | 8 | 6 | 0 | 7 | 9 | 1 | 4 | 2 | 3 | 5 |
| $f_5(x)$ | 6 | 5 | 9 | 4 | 1 | 2 | 7 | 8 | 0 | 3 |
| $f_6(x)$ | 5 | 3 | 1 | 7 | 2 | 8 | 4 | 6 | 9 | 0 |
| $f_7(x)$ | 3 | 0 | 2 | 4 | 8 | 6 | 7 | 5 | 1 | 9 |
| $f_8(x)$ | 0 | 9 | 8 | 7 | 6 | 5 | 4 | 3 | 2 | 1 |

In accordance with the invention there may be provided means which are connected by one or more conductors to a store in which the steady product is registered and by one or more conductors to a means determining the ordinal number of the symbol, the output(s) indicating the checking symbol.

The invention will now be described more fully with reference to the drawing which shows by way of non-limiting example a few embodiments of the checking device according to the invention.

Therein:

Figure 1:
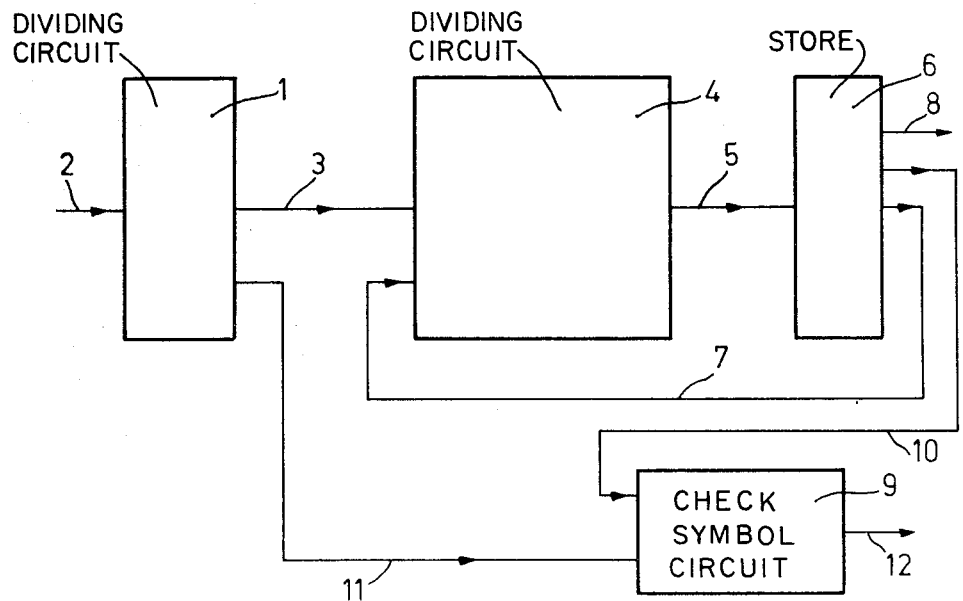
FIG. 1 shows a schematic block diagram of the whole device.

FIG. 1 shows the circuit diagram of a device in which a dividing circuit 1 receives via one or more conductors 2 directly or indirectly, for example, by pulse sequences, the application of voltages by means of a keyboard or in another known manner, $2m$-valent symbols $a_i$, which are converted therein into the values $f_i(a_i)$ depending upon the positions, which like the symbols are represented in known manner unambiguously by signals across one or more conductors 3, which are connected to a further dividing circuit 4, which is connected through one or more conductors 5 to a store 6, which may occupy at least $2m$ positions and which supplies via one or more conductors 7 the product of the values introduced via the conductors 3 and 5. This delivered value is fed at the introduction of the next value $f_{i+1}(a_{i+1})$ via the conductor 3 to the preceding product into the dividing circuit 4. At the initial position of the device, at the introduction of the first symbol $a_1$, a fixed chosen value, independent of the group of symbols, is applied via the conductor(s) 7 to the dividing circuit 4. This fixed value may, if desired, be stored in the store 6. In this case a reset signal has to be provided, which sets the store 6 to this fixed value after each check of a group of symbols. From the store 6 one or more conductors 8 provides an information about the detection or non-detection of an error in the group of symbols introduced.

In order to determine the checking symbol in a simple, rapid manner the device described above may be provided with a circuit 9 connected by one or more conductors 10 to the store 6 and by one or more conductors 11 to the dividing circuit 1. This circuit 9 provides via one or more conductors 12 the information which determines the checking symbol.

Hereinafter the circuits 1, 4 and 9 will be described in detail. It should be noted that it is possible to use a dividing circuit in which the functions of the dividing circuit 4 and of the store 6 are combined.

Figure 2:
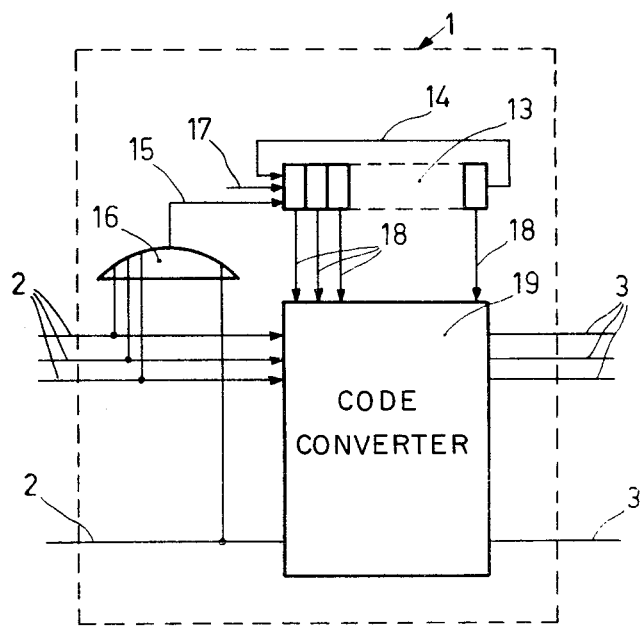
FIG. 2 shows one embodiment of the means providing the adjunctions.

The dividing circuit 1 shown in FIG. 2 comprises a counting member 13, the capacity of which determines the number of symbols of the group of symbols. This counting member is, however, redundant, when the conductors 2 are connected to a complete keyboard. If the code is periodical, the counting member 13 may be cyclically coupled, which is indicated by the line 14, in which case the capacity is unlimited. The counting member 13 may as an alternative be a continuously coupled shift register, in which only one of the sections has a "1." This counting member is constructed so that if it receives a pulse via a conductor 15 it counts on by one step. The way of production of this pulse depends upon the technical representation of these symbols and the pulse may even be present as such during the introduction at one of the conductors 2. In FIG. 2 it is assumed that for each symbol a separate conductor 2 is provided, in which case all conductors 2 (via an Or-gate 16) can be connected to the conductor 15. By means of a conductor 17 the counting member 13 can be reset prior to the beginning of a group of symbols.

The position of the counting member 13 is transmitted via a conductor 18 to a code converter 19, to which also the conductors 2 are connected. This code converter 19 passes via the conductor(s) 3 the adjoined values $f_i(a_i)$ to the dividing circuit 4. In the case of a period 12 and if $m = 5$, in which the symbols are represented by numbers, the code converter is determined by the following table:

TABLE C.

Ordinal number of symbol in the order of introduction

| | 1 | 2 | 3 | 4 | 5 | 6 | 7 | 8 | 9 | 10 |
| | 11 | 12 | | | | | | | | |
|---|---|---|---|---|---|---|---|---|---|---|
| | 0 | 3 | 4 | 4 | 1 | 3 | 3 | 2 | 1 | 1 | 4 |
| | 2 | 2 | | | | | | | | |
| | 1 | 1 | 9 | 8 | 2 | 5 | 8 | 4 | 7 | 8 | 3 |
| | 6 | 8 | | | | | | | | |
| | 2 | 2 | 1 | 5 | 6 | 0 | 9 | 8 | 9 | 2 | 2 |
| | 9 | 6 | | | | | | | | |
| | 3 | 0 | 2 | 0 | 9 | 1 | 4 | 6 | 5 | 9 | 6 |
| | 8 | 3 | | | | | | | | |
| | 4 | 4 | 5 | 9 | 4 | 2 | 7 | 9 | 0 | 5 | 8 |
| | 5 | 4 | | | | | | | | |
| | 5 | 5 | 6 | 7 | 5 | 8 | 2 | 0 | 3 | 0 | 7 |
| | 4 | 1 | | | | | | | | |
| | 6 | 6 | 3 | 2 | 7 | 9 | 6 | 7 | 8 | 4 | 0 |
| | 1 | 0 | | | | | | | | |
| | 7 | 7 | 0 | 6 | 8 | 6 | 1 | 1 | 6 | 7 | 1 |
| | 3 | 9 | | | | | | | | |
| | 8 | 8 | 7 | 3 | 3 | 7 | 5 | 3 | 4 | 6 | 5 |
| | 0 | 7 | | | | | | | | |
| | 9 | 9 | 8 | 1 | 0 | 4 | 0 | 5 | 2 | 3 | 9 |
| | 7 | 5 | | | | | | | | |

Figure 3:
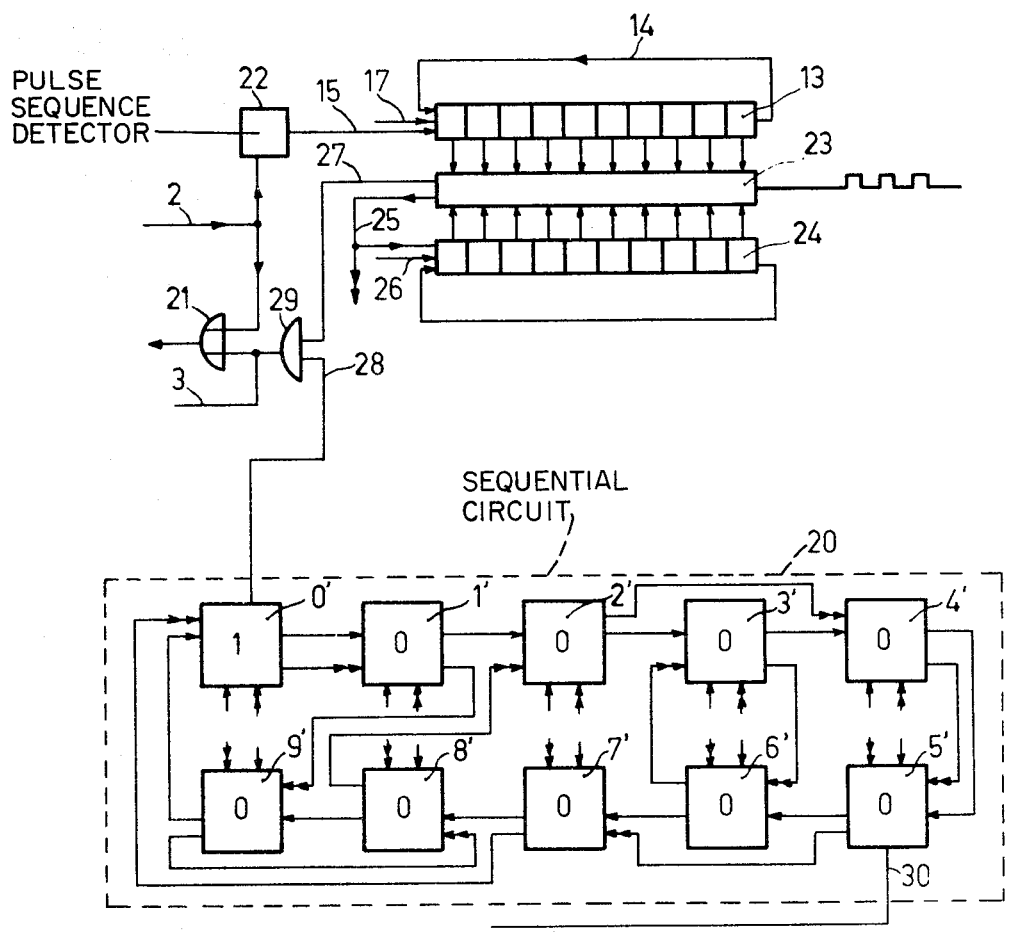
FIG. 3 shows a further embodiment of the means providing the adjunctions.

FIG. 3 shows an embodiment in which the code converter 19 is replaced by a sequential circuit 20, which comprises a number of shift register sections $2m$ equal to 10, indicated by 0' to 9'. These sections are circularly coupled in two ways, the first coupling being indicated by conductors having a single arrow and the second by conductors having a double arrow. Two clock pulse systems are provided, these pulses being applied to each of the sections through a control-input corresponding to the two ways of circular coupling, which is indicated by a single arrow and a double arrow respectively.

In the initial position of this sequential circuit 20 the section 0' contains a "1" and the other sections contain a "0." It will be assumed that the symbols are consecutively numbered and are represented by a number of pulses equal to the number of the symbol. In this case the base is assumed to be the digits 0 to 9 having the numbers 1 to 10.

The pulse sequence coming in across the conductor 2 is applied via an Or-gate 21 to the first clock pulse input. It is thus ensured that after the introduction of the symbol $a_i$ the section $(a_i)'$ contains the "1" and the other sections contain a "0." The mod 8 counting member 13 shown in FIG. 2 in the position $i$ performs one further step, for example, by means of a pulse-sequence detector 22. With the aid of a comparison circuit 23 and an auxiliary counting member 24 preadjusted for each symbol $i$ pulses are adjoined via a conductor 25 to the second feedback input and to this auxiliary counting member 24, which is provided with a reset input 26. When the comparison circuit indicates that the two counting members 13 and 24 are in the same positions, pulses are passed via a conductor 27, as well as a conductor 28 from the section 0' to an And-gate 29, the output of which is connected via a second input of the Or-gate 21 to the first clock-pulse input. The output of the And-gate 29 provides via the conductor 3 a pulse sequence for the dividing circuit 4, the number of pulses of which is equal to $f_i(a_i)$ as is indicated in the following table.

TABLE D.

| x | 0 | 1 | 2 | 3 | 4 | 5 | 6 | 7 | 8 | 9 |
|---|---|---|---|---|---|---|---|---|---|---|
| $f_1(x)$ | 9 | 1 | 6 | 4 | 5 | 3 | 7 | 0 | 8 | 2 |
| $f_2(x)$ | 1 | 2 | 5 | 7 | 3 | 0 | 4 | 9 | 6 | 8 |
| $f_3(x)$ | 2 | 8 | 3 | 4 | 0 | 9 | 7 | 1 | 5 | 6 |
| $f_4(x)$ | 8 | 6 | 0 | 7 | 9 | 1 | 4 | 2 | 3 | 5 |
| $f_5(x)$ | 6 | 5 | 9 | 4 | 1 | 2 | 7 | 8 | 0 | 3 |
| $f_6(x)$ | 5 | 3 | 1 | 7 | 2 | 8 | 4 | 6 | 9 | 0 |
| $f_7(x)$ | 3 | 0 | 2 | 4 | 8 | 6 | 7 | 5 | 1 | 9 |
| $f_8(x)$ | 0 | 9 | 8 | 7 | 6 | 5 | 4 | 3 | 2 | 1 |

If $i = 4$ and $a_i = 7$, the following occurs:

First seven pulses are introduced through the first clock-pulse input so that the "1" gets into section 7'. Then four pulses are introduced via the second clock-pulse input. Thus the "1" passes via the section 0', 1', 9' to 8'. Subsequently such a number of pulses is applied via the first clock-pulse input that the "1" of section 8' passes to section 0' so that two pulses are applied via the conductor 3 to the dividing circuit 4, which corresponds to the underlined 2 in the Table D.

The symbols may of course also be introduced in parallel by setting directly a "1" in the section $a_i$ and a "0" in the other sections. The delivery may also be performed in parallel by providing each section with a read wire. Each of the four combinations is possible, whereas if both writing and reading are performed in parallel the whole first feedback becomes superfluous.

As shown in FIG. 3 the section 5' is provided with an output 30, so that it is ensured that the pulse sequence applied to the dividing circuit 4 exceeds five pulses, so that this output 30 delivers a signal.

Figure 4:
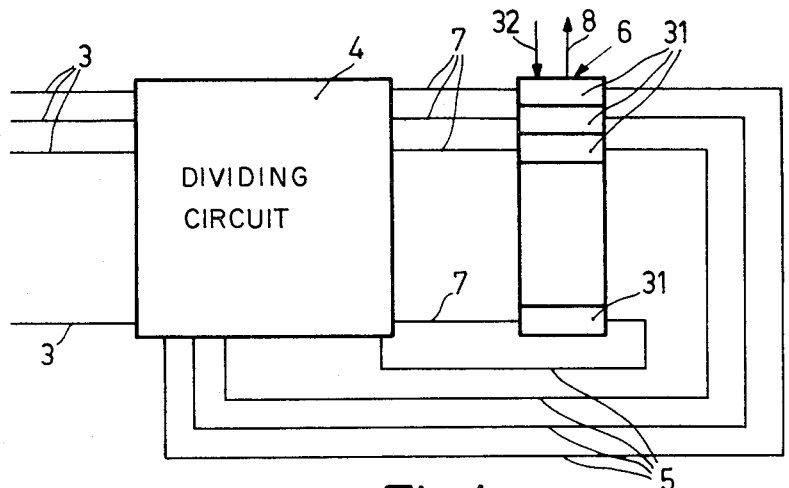
FIG. 4 shows an embodiment of the means for determining the steady product of the adjoined values in the diedric group and registering it in a store and FIG. 5 shows an embodiment having the function of determining of the steady product of the adjoined values in the diedric group and that of registering it in a store.

The dividing circuit 4 in the embodiment shown in FIG. 4 is formed by a code converter to which the separate values are applied via a separate conductor 3, this code converter being connected by the same number of conductors 7 to the store 6, which is connected via the conductors 5 to the code converter 4 in feedback. This code converter operates in accordance with the multiplication of the diedric group. For a chosen value $m = 5$ the Table A mentioned above applies.

The store 6 may comprise $2mD$ flip-flops 31, which take up the values applied via the conductors 7 upon a clock pulse command. The output of each of these flip-flops is fed back to the code converter 4 by one of the conductors 5. The store 6 is furthermore provided with one or more conductors 32 by means of which it can be set in a predetermined state.

The device described above operates as follows:

It is assumed that the store is in the state "8" and that a "2" is applied to the conductors 3. Via the conductors 5 a "8" enters the code converter, as a result of which a "6" is applied to the conductors 7, said "6" being taken over by the store 6 after a clock pulse, the store occupying then the state "6."

The output 8 indicates whether an error is detected in the checked group of symbols.

Figure 5:
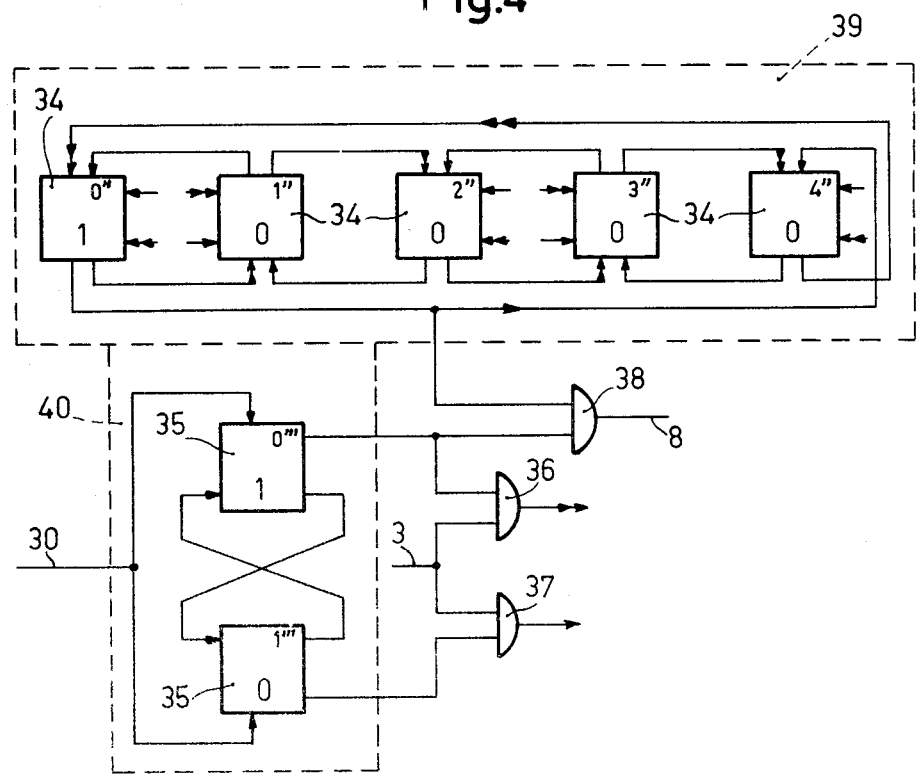

Instead of applying the values in parallel to different conductors, they may be represented by pulse sequences as in the embodiment shown in FIG. 5, where the code converter and the store are not separated. In this embodiment $m$ shift register sections 34, in this case five sections, are provided, which are designated in common by 39 and separately by 0" to 4" and fed back in two ways, which is indicated by single and double arrows. The clock pulse inputs are indicated correspondingly by single and double arrows. This embodiment comprises furthermore two shift register sections 35, which are designated in common by 40 and separately by 0''' and 1'''. These sections 0''' and 1''' are cyclically fed back and receive a shift pulse via the conductor 30 so that the register 40 is reset when a value is applied, which is represented by more than $m$ pulses, in this case five pulses. The resetting may, of course, be carried out in any other known manner. The outputs of the sections 0''' and 1''' are applied to the inputs of a gate 36 and 37 respectively, to which in addition the pulse sequences are applied by the conductors 3. The outputs of the gates 36 and 37 supply the clock pulses for the shift register sections 34. The output of one of the two sections 0''' and 1''', in this case the output of section 0''' and the output of one of the shift register sections 34, in this case the output of the section 0" are connected to a gate 38, the output 8 of which indicates whether an error is detected in the checked group of symbols.

With the concept of the diedric group referred in the preamble each element may be considered to form a number of elementary rotations followed or not followed by a reflection and the shift register sections simulate these rotations, whereas the sections 35 represent the reflection.

In the present case a 8 ($\delta^3 \epsilon$) will be represented by a "1" in section 3" and a "1" in section 1''' and a "0" in all further sections. The introduction of a "2" means the introduction of two pulses along the conductor 3, as a result of which a "1" gets into section "1" which in conjunction with the "1" in section 1''' means a "6."

In order to co-ordinate the dividing circuits 1 and 4 various possibilities are available.

When the introduction is in parallel and the delivery in series, it is not necessary to reset to 0' the "1" in the shift register 20, and it suffices to apply pulses until the "1" arrives at section 5'. In the latter case it applies that $\delta = 1$.

With series introduction it is advantageous to end with a "1" in the section 0'. This is possible by applying five additional pulses to the first feedback input, it being irrelevant whether these pulses go into the store or not. It is furthermore irrelevant whether the section 1''' of the sections 0''' and 1''' connected as a 2-divider, interchange their contents prior to or after these five pulses. A reset may be carried out or the sections 5' and 0' may be interconnected, in which case only a single pulse is required for getting the "1" into section 0' so that four pulses are economized.

It should be noted that the circuit 9 of FIG. 1 may be a code converter, in which the checking symbol in the decimal case, i.e. $m = 5$ and $k = 12$, when the adjunctions are carried out in accordance with Table C, is determined by the following table:

TABLE E.—STATE OF STORE

| A | 0 | 1 | 2 | 3 | 4 | 5 | 6 | 7 | 8 | 9 |
|---|---|---|---|---|---|---|---|---|---|---|
| Position of the checking symbol (mod 12): | | | | | | | | | | |
| 1 | 3 | 4 | 0 | 2 | 1 | 5 | 6 | 7 | 8 | 9 |
| 2 | 7 | 0 | 6 | 3 | 2 | 4 | 5 | 8 | 9 | 1 |
| 3 | 3 | 0 | 8 | 6 | 9 | 2 | 7 | 5 | 1 | 4 |
| 4 | 9 | 4 | 8 | 1 | 0 | 5 | 2 | 6 | 7 | 3 |
| 5 | 2 | 9 | 0 | 4 | 3 | 1 | 7 | 8 | 5 | 6 |
| 6 | 9 | 3 | 0 | 5 | 7 | 8 | 6 | 4 | 1 | 2 |
| 7 | 5 | 1 | 8 | 0 | 7 | 9 | 3 | 6 | 2 | 4 |
| 8 | 4 | 8 | 5 | 9 | 0 | 3 | 7 | 11 | 66 | 2 |
| 9 | 5 | 6 | 9 | 2 | 0 | 4 | 8 | 7 | 1 | 3 |
| 10 | 6 | 0 | 1 | 2 | 7 | 8 | 3 | 5 | 4 | 9 |
| 11 | 8 | 5 | 7 | 0 | 6 | 4 | 1 | 9 | 3 | 2 |
| 12 | 6 | 4 | 3 | 0 | 5 | 9 | 2 | 8 | 1 | 7 |

If $k = 8$ and the adjunctions are made in accordance with Table D, the checking symbol is determined by the following Table F.

TABLE F.—STATE OF STORE

| A | 0 | 1 | 2 | 3 | 4 | 5 | 6 | 7 | 8 | 9 |
|---|---|---|---|---|---|---|---|---|---|---|
| $A^{-1}$ | 0 | 4 | 3 | 2 | 1 | 5 | 6 | 7 | 8 | 9 |
| Position of checking digit (mod 8): | | | | | | | | | | |
| 1 | 7 | 3 | 5 | 9 | 1 | 4 | 2 | 6 | 8 | 0 |
| 2 | 5 | 6 | 4 | 1 | 0 | 2 | 8 | 3 | 9 | 7 |
| 3 | 4 | 3 | 2 | 0 | 7 | 8 | 9 | 6 | 1 | 5 |
| 4 | 2 | 6 | 8 | 7 | 5 | 9 | 1 | 3 | 0 | 4 |
| 5 | 8 | 3 | 9 | 5 | 4 | 1 | 0 | 6 | 7 | 2 |
| 6 | 9 | 6 | 1 | 4 | 2 | 0 | 7 | 3 | 5 | 8 |
| 7 | 1 | 3 | 0 | 2 | 8 | 7 | 5 | 6 | 4 | 9 |
| 8 | 0 | 6 | 7 | 8 | 9 | 5 | 4 | 3 | 2 | 1 |

It will be obvious that the invention is not restricted to the embodiments described above and shown in the drawing and that numerous variations are possible within the scope of the invention.

What is claimed is:

1. A device for checking a group of symbols chosen from among $2m$ different symbols and including a checking symbol, comprising means for adjoining a fixed value from a diedric group of the order $2m$ to every incoming symbol in accordance with the order of reception of said symbol so that at each position different values are adjoined to different symbols, a storage device, means responsive to each incoming symbol and value to form the steady product by the multiplication of the diedric group and said incoming values to register said steady product in said storage device, and means responsive to storage of the whole of said group of symbols as steady product for comparing the final result of said steady product with a predetermined value to determine error.

2. A device as claimed in claim 1 wherein permutations of the values produced by representing the value adjoined to a given symbol at a given position in the group of symbols by the value which would be adjoined to the same symbol if it were at the next position, have the property that, for every two different values, the product in the diedric group of the first value and the value adjoined by each of the said permutations to the second value differs from the product of the second value and the same permutation representation of the first value.

3. A device as claimed in claim 2 wherein the permutations each have the property that the values produced by multiplication of each value of the diedric group in this group with the value adjoined by the permutation to the first-mentioned value are optimally different.

4. A device as claimed in claim 1 wherein the permutations associated with symbol pairs sequentially contained in the group of symbols have the property that the permutations produced by the consecutive delivery of two of these adjacent pairs of permutations have the property that, for every predetermined value of the diedric group, the values produced by the consecutive multiplication of every value of the diedric group by said predetermined value and by the value adjoined by the permutation to the first value are optimally different for each of these fixed values.

5. A device as claimed in claim 1, wherein the means forming the steady product of the incoming values is a $2m$-valent register responsive to each incoming symbol for registering the value supplied by a code converter, said code converter converting the prior value of said register and the value adjoined to the instantly incoming symbol as incoming signals into the value which corresponds to the product in the diedric group of the two aforesaid values in a corresponding order, the final state of said register determining the steady product.

6. A device as claimed in claim 1 comprising a cyclic $m$-counter and a 2-divider, said $m$-counter counting forwardly and backwardly under the control of said 2-divider, wherein said values adjoined to symbols chosen from $2m$ symbols from the diedric group are represented by pulse sequences having different numbers of pulses, the numbers lying between 1 and $2m$, said pulses applied to the m-counter, said 2-divider being reset subsequent to the introduction of each sequence only when the relevant pulse sequence exceeds $m$, the final states of the m-counter and of the 2-divider (40) determining the steady product.

7. A device as claimed in claim 1, wherein a counter is provided, which is set to zero at the beginning of every introduced group of symbols and which switches on by one step at every incoming signal, said signals and said introduced symbols being applied to the inputs of a code converter, the outputs of which represent the values of the diedric group adjoined to the symbol.

8. A device as claimed in claim 3, wherein for a given positive integer $k$, the adjunction of the values from the diedric group to the symbols is the same for symbols whose position numbers in the introduced group of symbols differ by $k$.

9. A device as claimed in claim 7, wherein said counter is a cyclic $k$-counter.

10. A device as claimed in claim 8, wherein said adjunctions are chosen so that the permutations, independently of the positions of each pair, are all the same.

11. A device as claimed in claim 1, wherein $2m$ binary shift register sections are provided, said sections arranged in dependence upon the permutation in groups which are fed back individually in an order of succession also depending upon the permutation, the sections being adjoined in a fixed manner to the symbols, the corresponding section at the reception of a symbol receiving a "1" and the other sections receiving a "0," the same number of pulses being added to the sections as corresponds to the ordinal number of introduction of the symbol and the values from the sections correspond in a fixed manner to the diedric group, the place of the "1" determining the adjoined value from the diedric group.

12. A device as claimed in claim 1, wherein $m = 5$, the groups of symbols may be decimal numbers and the diedric group comprises 10 values which are represented by 0, 1, 2, 3, 4, 5, 6, 7, 8, 9 so that the multiplication in this group is performed in accordance with the table:

TABLE A.

| X | 0 | 1 | 2 | 3 | 4 | 5 | 6 | 7 | 8 | 9 |
|---|---|---|---|---|---|---|---|---|---|---|
| 0 | 0 | 1 | 2 | 3 | 4 | 5 | 6 | 7 | 8 | 9 |
| 1 | 1 | 2 | 3 | 4 | 0 | 6 | 7 | 8 | 9 | 5 |
| 2 | 2 | 3 | 4 | 0 | 1 | 7 | 8 | 9 | 5 | 6 |
| 3 | 3 | 4 | 0 | 1 | 2 | 8 | 9 | 5 | 6 | 7 |
| 4 | 4 | 0 | 1 | 2 | 3 | 9 | 5 | 6 | 7 | 8 |
| 5 | 5 | 9 | 8 | 7 | 6 | 0 | 4 | 3 | 2 | 1 |
| 6 | 6 | 5 | 9 | 8 | 7 | 1 | 0 | 4 | 3 | 2 |
| 7 | 7 | 6 | 5 | 9 | 8 | 2 | 1 | 0 | 4 | 3 |
| 8 | 8 | 7 | 6 | 5 | 9 | 3 | 2 | 1 | 0 | 4 |
| 9 | 9 | 8 | 7 | 6 | 5 | 4 | 3 | 2 | 1 | 0 |

13. A device as claimed in claim 2, wherein the groups of symbols are formed by decimal numbers, characterized in that for each decimal digit at each position the adjoined value from the diedric group multiplied in the diedric group by the value adjoined to zero at the next position is preferably as frequently as possible unequal to the value adjoined at the first position to "1" multiplied by the value adjoined to the first-mentioned decimal digit at the next position.

14. A device as claimed in claim 8 wherein $k = 12$ and the adjunction of the 10 symbols of the groups of symbols to be introduced is carried out in accordance with the following table:

TABLE C.

Ordinal number of symbol in the order of introduction

| 1 | 2 | 3 | 4 | 5 | 6 | 7 | 8 | 9 | 10 | 11 | 12 |
|---|---|---|---|---|---|---|---|---|----|----|----|
| 2 | 2 | | | | | | | | | | |
| 6 | 8 | | | | | | | | | | |
| 9 | 6 | | | | | | | | | | |
| 8 | 3 | | | | | | | | | | |
| 5 | 4 | | | | | | | | | | |
| 4 | 1 | | | | | | | | | | |
| 1 | 0 | | | | | | | | | | |
| 3 | 9 | | | | | | | | | | |
| 0 | 7 | | | | | | | | | | |
| 7 | 5 | | | | | | | | | | |

15. A device as claimed in claim 14, in which the groups of symbols are formed by decimal numbers, wherein the permutations are all equal to:

| X | 0 | 1 | 2 | 3 | 4 | 5 | 6 | 7 | 8 | 9 |
|---|---|---|---|---|---|---|---|---|---|---|
| $g(x)$ | 9 | 2 | 8 | 0 | 7 | 3 | 5 | 4 | 6 | 1 | so that after a preferential choice of the adjunction the adjunctions are fixed by the following table:

TABLE D.

| | 0 | 1 | 2 | 3 | 4 | 5 | 6 | 7 | 8 | 9 |
|---|---|---|---|---|---|---|---|---|---|---|
| $f_1(x)$ | 9 | 1 | 6 | 4 | 5 | 3 | 7 | 0 | 8 | 2 |
| $f_2(x)$ | 1 | 2 | 5 | 7 | 3 | 0 | 4 | 9 | 6 | 8 |
| $f_3(x)$ | 2 | 8 | 3 | 4 | 0 | 9 | 7 | 1 | 5 | 6 |
| $f_4(x)$ | 8 | 6 | 0 | 7 | 9 | 1 | 4 | 2 | 3 | 5 |
| $f_5(x)$ | 6 | 5 | 9 | 4 | 1 | 2 | 7 | 8 | 0 | 3 |
| $f_6(x)$ | 5 | 3 | 1 | 7 | 2 | 8 | 4 | 6 | 9 | 0 |
| $f_7(x)$ | 3 | 0 | 2 | 4 | 8 | 6 | 7 | 5 | 1 | 9 |
| $f_8(x)$ | 0 | 9 | 8 | 7 | 6 | 5 | 4 | 3 | 2 | 1 |

16. A device as claimed claim 1, wherein means are provided which are connected by one or more conductors to said store containing the steady product and by one or more conductors to a means determining the order of succession of the checking symbol, the output(s) indicating the checking symbol.

* * * * *

UNITED STATES PATENT OFFICE
CERTIFICATE OF CORRECTION

Patent No. 3,675,202          Dated July 4, 1972

Inventor(s) Jacobus Verhoeff

It is certified that error appears in the above-identified patent and that said Letters Patent are hereby corrected as shown below:

Column 2, line 1, "g" should be after "$\begin{pmatrix} \alpha & \beta & \gamma \\ \beta & \gamma & \alpha \end{pmatrix}$"

Column 2, line 4, cancel "so that"

Column 2, line 22, "$m > j > 0$" should be --$m > j \geq 0$--

Column 2, line 26, "$m > j > 0$" should be --$m > j \geq 0$--

Column 2, line 33, "s(t())Xs(t(b))" should be --s(t(a))Xs(t(b))--

Column 2, line 40, "$m > j > 0$" should be --$m > j \geq 0$--

Column 3, line 50, in the formula "$\rightarrow$" should be --$\neq$--

Column 3, line 53, in the formula "$\rightarrow$" should be --$\neq$--

Column 3, line 69, "xXgi(x)   yXgi(y) should be
        --xXgi(x) $\neq$ yXgi(y)--

Column 4, line 42, cancel "are'

Column 4, line 43, before "after" insert --the 2 - divider--

Column 6, line 55, "2mpositions" should be --2m positions--

UNITED STATES PATENT OFFICE
CERTIFICATE OF CORRECTION

Patent No. 3,675,202      Dated July 4, 1972

Inventor(s) Jacobus Verhoeff

It is certified that error appears in the above-identified patent and that said Letters Patent are hereby corrected as shown below:

Claim 14, "Table C" should be written as follows:

TABLE C.

Ordinal number of symbol in the order of introduction

|   | 1 | 2 | 3 | 4 | 5 | 6 | 7 | 8 | 9 | 10 | 11 | 12 |
|---|---|---|---|---|---|---|---|---|---|----|----|----|
| 0 | 3 | 4 | 4 | 1 | 3 | 3 | 2 | 1 | 1 | 4  | 2  | 2  |
| 1 | 1 | 9 | 8 | 2 | 5 | 8 | 4 | 7 | 8 | 3  | 6  | 8  |
| 2 | 2 | 1 | 5 | 6 | 0 | 9 | 8 | 9 | 2 | 2  | 9  | 6  |
| 3 | 0 | 2 | 0 | 9 | 1 | 4 | 6 | 5 | 9 | 6  | 8  | 3  |
| 4 | 4 | 5 | 9 | 4 | 2 | 7 | 9 | 0 | 5 | 8  | 5  | 4  |
| 5 | 5 | 6 | 7 | 5 | 8 | 2 | 0 | 3 | 0 | 7  | 4  | 1  |
| 6 | 6 | 3 | 2 | 7 | 9 | 6 | 7 | 8 | 4 | 0  | 1  | 0  |
| 7 | 7 | 0 | 6 | 8 | 6 | 1 | 1 | 6 | 7 | 1  | 3  | 9  |
| 8 | 8 | 7 | 3 | 3 | 7 | 5 | 3 | 4 | 6 | 5  | 0  | 7  |
| 9 | 9 | 8 | 1 | 0 | 4 | 0 | 5 | 2 | 3 | 9  | 7  | 5  |

Signed and sealed this 29th day of May 1973.

(SEAL)
Attest:

EDWARD M. FLETCHER, JR.       ROBERT GOTTSCHALK
Attesting Officer      Commissioner of Patents